SINGLE TOUCH CAPACITY SWITCH
Filed Feb. 17, 1967
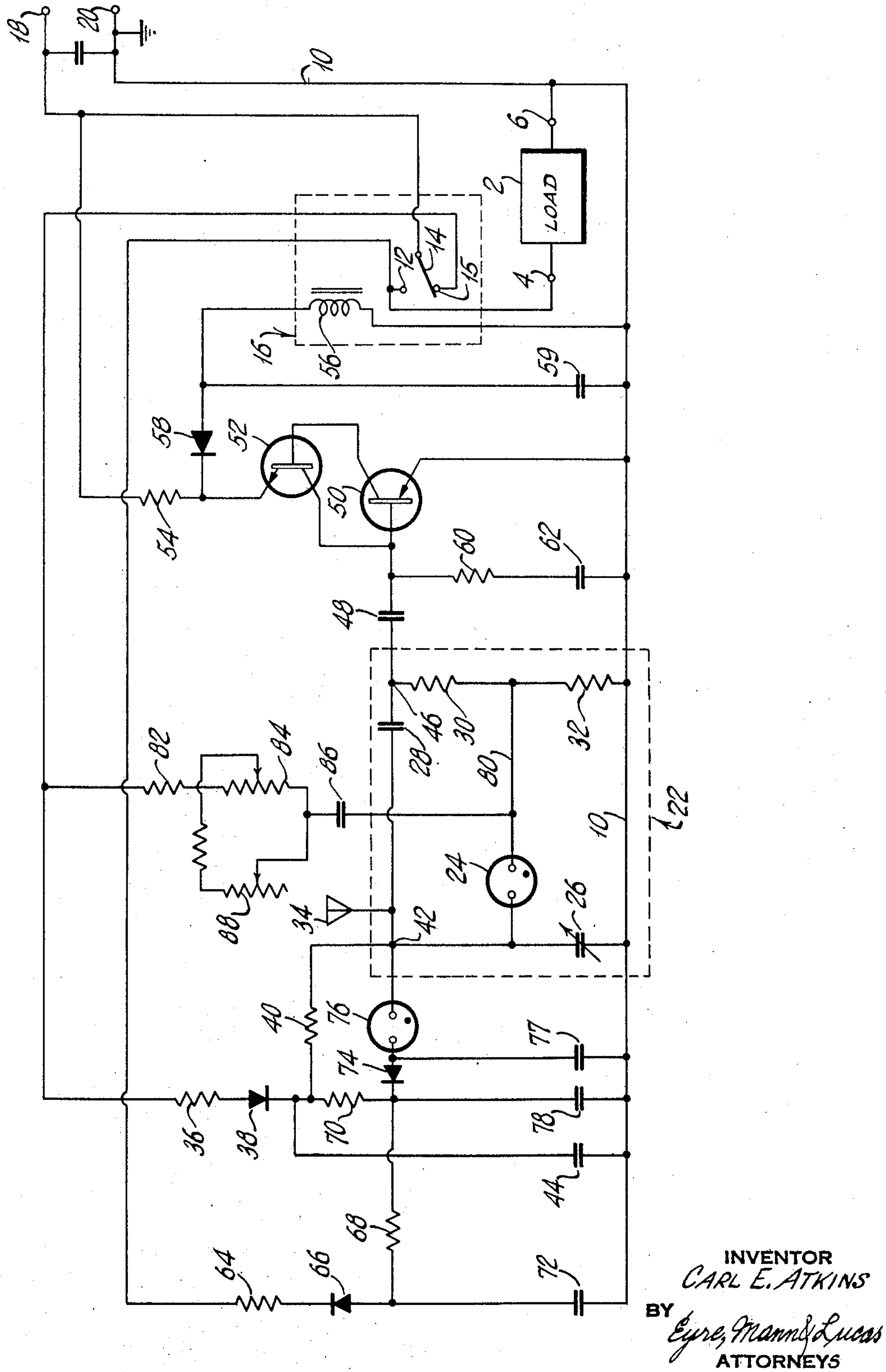
INVENTOR
CARL E. ATKINS
BY
Eyre, Mann & Lucas
ATTORNEYS

United States Patent Office 3,492,542

Patented Jan. 27, 1970

3,492,542

SINGLE TOUCH CAPACITY SWITCH

Carl E. Atkins, Montclair, N.J., assignor to Wagner Electric Corporation, a corporation of Delaware Filed Feb. 17, 1967, Ser. No. 616,835

Int. Cl. H01h *47/12, 47/32*

U.S. Cl. 317—146 8 Claims

ABSTRACT OF THE DISCLOSURE

An antenna is momentarily touched to alter the capacitance in one loop of a relaxation oscillator, resulting in a change in polarity of the oscillator output pulses from negative to positive. Delay means are provided to prevent a continuous touching of the antenna for a specific length of time from being sensed as two consecutive touchings. The oscillator output is applied to the control electrode of a solid-state switching device. This device is rendered non-conductive by positive pulses, thereby resulting in the energization of the winding of a relay which controls the energization of a load, whereupon the polarity of the voltage applied to the oscillator is reversed, causing the polarity of the oscillator's output pulses to remain positive so as to maintain the solid-state switching device non-conductive. The oscillator output is again reversed in polarity by touching the same antennt a second time, thereby causing the solid-state switching device to be rendered conductive so as to shunt the relay winding which is thus deenergized to cause deenergization of the load, whereupon the polarity of the voltage applied to the oscillator is again reversed so as to maintain the oscillator output negative after the second touching of the antenna.

The present invention relates to capacity or touch responsive circuits and comprises a novel circuit arrangement in which change in capacity resulting, for example, from touch of an element causes energization of a load which load is maintained energized after the touch has been removed from the element and until the same element is touched a second time. The new circuit may be employed to control energization of a lamp or warning signal of any type, actual contact with the element not being essential.

In the new circuit of the present invention, an oscillator, the output of which varies with the capacity to ground of the element to be touched, provides pulses of one polarity when the element is first touched, to cause energization of the lamp or other load. Upon energization of the load, the polarity of the voltage applied to the oscillator is reversed to thereby cause reversal of the polarity of the pulses supplied by the oscillator or change in magnitude thereof during the period of energization of the load. The circuitry is such that each time the element is touched to energize or deenergize the load, the polarity of the voltage applied to the oscillator is reversed, after a time delay sufficient to insure removal of the hand from the element.

The particular oscillator of the new circuit is of the type described and broadly claimed in U.S. Patent 3,199,-033 dated Aug. 10, 1964 to Robert L. Ziolkowski and the present applicant and comprises a non-linear breakdown device, two capacitors which charge from the power supply and discharge through the non-linear device to produce a series of voltage pulses and a summing circuit for the produced pulses. The output of the oscillator before the element hereinafter called an antenna is touched is such as to maintain a semiconductor switching device conducting. A relay, the winding of which is connected in parallel with the semiconductor device, is thereupon maintained deenergized and the load circuit is likewise maintained deenergized. When the antenna is touched or its capacity to ground is altered by the presence of an individual, the changed capacity thereof which is in parallel with one of the capacitors of the oscillator causes the output from the oscillator to change in a direction to render the semiconductor device non-conductive. The relay thereupon becomes energized to close the circuit of the load and simultaneously to reverse the polarity of the voltage applied to the oscillator. Additional circuitry including a second non-linear breakdown device and a diode is connected in the circuit between the source and the oscillator and this additional circuitry provides the desired time delay before reversal of the input to the oscillator.

For a better understanding of the invention, reference may be had to the drawing of which the single figure is a circuit diagram representing a preferred embodiment of the invention.

A load to be controlled and which may be a lamp is indicated in box form at 2 as connected to terminals 4 and 6 of the circuit. Terminal 6 is connected to a grounded line 10 and terminal 4 is connected to a normally open contact 12 associated with the armature 14 of a relay 16. The armature 14 is connected to an input terminal 18 of a source of alternating voltage as, for example, 117 volts. The other terminal of the source, indicated at 20, is grounded. An oscillator, shown within the dashed enclosure 22, comprises a neon tube 24, a variable capacitor 26, a capacitor 28, and resistors 30 and 32. An element to be touched and included in the oscillator is shown as an antenna 34. The junction of resistors 30 and 32 is connected to one side of tube 24 and the other side of tube 24 is connected to the junction of capacitors 26 and 28 and to the antenna 34. The junction of capacitor 26 and resistor 32 is grounded. When the relay is deenergized, the ungrounded terminal 18 of the source is connected through the armature 14, fixed contact 15 associated therewith, a resistor 36, a diode 38, and a resistor 40 to the oscillator input terminal 42. A relatively large storage capacitor 44, of the order of .05 microfarad, is connected between the cathode of diode 38 and ground. Capacitors 26 and 28 are thus charged to a positive potential and when the charge thereon exceeds the breakdown voltage of the neon tube, these capacitors discharge through the neon lamp. Capacitor 26 will discharge through the lamp 24 and resistor 32 back to the other side of the capacitor 26. Capacitor 28 will discharge through the neon tube 24 and resistor 30 back to the other side of that capacitor. When the capacitors have discharged sufficiently, the neon tube 24 ceases to conduct and the charge on the capacitors will then build up to the breakdown value of the tube. Consequently, a series of pulses will appear across resistors 30 and 32 which are opposite in polarity and the sum thereof will be positive or negative depending on the relative values of these resistors and of the capacities.

Because of the provision of the storage capacitor 44, positive voltage will continue to be impressed upon the oscillator during the negative half cycles of the voltage source. Under initial conditions before the antenna 34 is touched, the pulses appearing at the output terminal 46 of the oscillator will be negative and these are impressed through a capacitor 48 upon the base of a PNP transistor 50 comprising one part of the semiconductor switching device. The other part of the switching device comprises an NPN transistor 52. The collector of transistor 50 is connected to the base of transistor 52 and the collector of transistor 52 is connected to the base of transistor 50. The emitter of transistor 50 is connected to ground and the emitter of transistor 52 is connected to the input terminal 18 through a resistor 54. The winding 56 of relay 16 is connected across the emitter of the transistors 50 and 52 in series with a diode 58. A capacitor 59 is connected directly across the relay winding 56. The base of transistor 50 is connected to the grounded line 10 through a resistor 60 and capacitor 62 to maintain a predetermined voltage bias on the base.

The remainder of the circuit will now be described together with an explanation of the operation of the entire circuit.

With no one touching the antenna 34 and with no influence on the capacity thereof by an individual, the pulses at the output of the oscillator 22 are negative and of sufficient magnitude to maintain the semiconductor switching device 50–52 conducting during the negative half cycle of the input voltage and thereby maintain the relay deenergized during those half cycles. During positive half cycles of the voltage, reverse current through transistor 52 charges capacitor 62 until the Zener breakdown voltage of transistor 50 is reached at which time both transistors will conduct in the reverse direction, thereby preventing undue reverse voltage across the diode 58 which is provided to block current to the relay during the positive half cycle of the voltage wave. The charging of capacitor 62 during the positive half cycle provides a positive bias at the base of transistor 50 which must be overcome by negative pulses from the oscillator of sufficient magnitude to make the semiconductor switching device conductive.

When the antenna 34 is touched or its capacity to ground increased substantially, it augments the current from capacitor 26 when the neon tube 24 breaks down and consequently increases the magnitude of the current pulses flowing through resistor 32. The pulses impressed upon the base of transistor 50 thus become either positive or, if remaining negative, of such low magnitude as to be unable to maintain the switching device conductive. The relay winding 56 then becomes energized during the negative half cycles of the voltage wave. The relay remains energized during the positive half cycles by discharge of capacitor 59 therethrough.

Prior to energization of the relay 16, positive voltage only is supplied to the oscillator through diode 38 and resistor 40. When the relay becomes energized, armature 14 engages contact 12 opening the circuit between terminal 18 and diode 38 and closing a circuit from terminal 18 through a resistor 64, a diode 66, a resistor 68, a resistor 70, and the resistor 40 to the input terminal 42 of the oscillator. A storage capacitor 72 is connected between the anode of diode 66 and ground to insure a supply of negative voltage during the positive half cycles of the voltage wave. Diode 66 is poled to pass only negative voltage from the input terminal 18. A diode 74 and neon tube 76 are connected in series across the resistors 70 and 40 and this path, in parallel with the resistors 70 and 40, passes current so long as the potential at input terminal 42 exceeds that at the junction of resistors 68 and 70. A capacitor 77 is connected between the anode of diode 74 and ground. A capacitor 78 is connected between ground and the junction of resistors 68 and 70. Capacitor 78, which is of the order of .1 microfarad, becomes positively charged when the relay is deenergized and negatively charged when the relay is energized. During the transition period following shift of position of the armature 14 while the polarity of charge on capacitor 78 is changing, the potential at the oscillator input terminal is positive with respect to that at the junction of resistors 68 and 70 and accordingly current will flow through neon tube 76 and diode 74 until the potential at terminal 42 is sufficiently close to the potential at the junction of resistors 68 and 70 to cause tube 76 to become nonconductive. Thus, a time delay, sufficient to insure removal of the hand of the individual from the antenna 34, is provided.

Once the negative voltage is impressed on the input terminal of the oscillator, the resultant pulses at terminal 46 will be positive and the semiconductor switching device will be maintained non-conductive to maintain the relay energized and consequently the load also energized.

When the operator again touches the antenna 34, the polarity of the resultant pulses from the oscillator will reverse causing the semiconductor switching device to again conduct and deenergize the relay to open the load circuit. The oscillator input circuit then reverses to the initial charging circuit through diode 38 and armature 14 and after the time delay provided by the elements 74 and 76, as above described, the negative pulses from the oscillator will maintain the semiconductor switching device conducting.

Connected between the fixed contact 15 associated with the armature 14 and the lead 80 connecting the neon tube 24 with the junction of resistors 30 and 32 of the oscillator is a series circuit including a resistor 82, an adjustable resistor 84, and capacitor 86 and connected across the resistor 84 is a second adjustable resistor 88.

This circuit including the resistors 82, 84 and 88 and the capacitor 86 is effectively in parallel with resistor 32 when the relay is deenergized as the connection to the line terminal 18 may be considered as substantially a connection to the ground. The capacitor 86 in this circuit blocks the low frequency current from the source. The resistors 84 and 88 are so adjusted that the voltage drop across resistor 30 will be larger than that across resistor 32 and its parallel circuit so that when the antenna is not touched and the relay is deenergized, the pulses appearing at output terminal 46 of the oscillator will be sufficiently negative to maintain the semiconductor switching device conductive. When the antenna is touched and the relay accordingly energized, the parallel circuit through resistors 82, 84 and 88 is open at the armature of the relay, thus increasing the effective resistance between ground and the lead 80. Variable capacitor 26 is adjusted to maintain the proper relationship between the magnitudes of the voltage drops across resistors 30 and 32 when the relay is energized.

The invention has now been described in connection with a single embodiment thereof. Obviously various changes in details of the oscillator circuit and in other portions of the circuit could be made without departing from the spirit of the invention. For example, the two transistors 50 and 52 could be replaced by a four-zone switching device of the type that is triggered by application of a negative voltage pulse to the inner N zone of the semiconductor or devices that are triggered by positive pulses could be employed with corresponding reversal of the diode in the circuit of the relay winding. Other changes will occur to those skilled in the art.

I claim:

1. A capacitance-responsive circuit including:

(1) first and second power input terminals, said second terminal being grounded;

(2) no more than one signal input means operative to sense variations in capacitance to ground;

(3) relay means operative to control energization and de-energization of a load and including a winding, an armature which is connected to said first power input terminal, and first and second contacts; and (4) circuit means interconnecting both said signal input means and said power input terminals with said first and second contacts and said armature of said relay means, said circuit means including an oscillator circuit to which direct current power of a first polarity is applied when said relay means is deenergized, and to which direct current power of a second polarity is applied when said relay means is energized, wherein when a source of alternating current power is connected across said first and second input terminals and a load is connected between said second contact of said relay means and said second power input terminal, said circuit means is operative normally to maintain said relay means and the load de-energized, and upon sensing of a first momentary signal by said signal input means, said circuit means is operative to energize and to maintain energized said relay means and consequently the load, and upon sensing of a second momentary signal by said input signal means, said circuit means is operative to de-energize and to maintain de-energized said relay means and consequently the load.

2. The capacitance-responsive circuit according to claim 1 wherein said circuit means includes means operative to prevent a signal of greater duration than is necessary to change the energization state of said relay means from causing more than one change in the energization state of said relay means.

3. The capacitance-responsive circuit according to claim 2 wherein said signal has a predetermined maximum duration.

4. The capacitance-responsive circuit of claim 1 wherein said circuit means comprises:

(1) said oscillator circuit means connected to said input signal means and operative to generate an output signal of a first range in the absence of an input signal and to generate an output signal of a second range when an input signal is sensed by said input signal means;

(2) solid state switching means having first, second and third terminals, said first and second terminals being connected between said first and second power input terminals, and said output signals of said oscillator circuit means being provided to said third terminal, said solid state switching means being rendered conductive by an output signal of said first range and nonconductive by an output signal of said second range;

(3) first energizing circuit means connected between said first contact of said relay means and said oscillator circuit means and operative to provide direct current power of a first polarity to said oscillator circuit means when said relay means is de-energized to cause the output of said oscillator circuit means to be of a second polarity;

(4) second energizing circuit means connected between said second contact of said really means and said oscillator circuit means and operative to provide direct current power of said second polarity to said oscillator circuit means when said relay means is energized to cause the output of said oscillator circuit means to be of said first polarity;

(5) coupling circuit means interconnecting said winding of said relay means with said first and second terminals of said solid state switching means, said coupling means being operative to block current of a first polarity from said winding and to maintain a direct current of a second polarity through said winding when said solid state switching means is nonconductive.

5. The capacitance-responsive circuit according to claim 4 further including delay circuit means interconnecting both said first and second energizing circuit means with said oscillator circuit means, said delay circuit means being operative to introduce a time delay between the closing of said armature and said first contact of said relay means and the application of direct current power of said first polarity to said oscillator circuit means, and being further operative to introduce a time delay between the closing of said armature and said second contact of said relay means and the application of direct current power of said second polarity to said oscillator circuit means.

6. The capacitance-responsive circuit according to claim 5 wherein said delay circuit means comprises:

(1) voltage breakdown means and rectification means connected in series from said oscillator circuit means to said first and second energizing circuit means;

(2) a first capacitance connected from the junction of the anode of said rectification means and said voltage breakdown means to ground; and (3) a second capacitance means connected from the cathode of said rectification means to ground.

7. The capacitance-responsive circuit according to claim 1 wherein said oscillator circuit means comprises:

(1) voltage breakdown means;

(2) a first capacitor and a first resistor connected in series to close a first discharge path through said voltage breakdown means;

(3) a second capacitor and a second resistor connected in series to close a second discharge path through said voltage breakdown means, the junction of said first and second capacitors being coupled to said first and second energizing circuit means and to said input signal means; and (4) impedance means connected from the junction of said voltage breakdown means and said second resistor to said first contact of said relay means, said impedance means being operative when said relay means is de-energized to reduce the net impedance in said second discharge path below the value of said net impedance when said relay means is energized.

8. The capacitance-responsive circuit of claim 4 wherein said solid state switching means includes bias storage circuit means operative to maintain said solid state switching means nonconductive when said output signal of said oscillator circuit means is in said second range.

References Cited

UNITED STATES PATENTS

| | | | |
|---|---|---|---|
| 2,810,066 | 10/1957 | Green. | |
| 3,200,304 | 8/1965 | Atkins et al. ---- | 317—148.5 XR |
| 3,200,305 | 8/1965 | Atkins -------- | 317—148.5 XR |
| 3,275,897 | 9/1966 | Atkins ------------- | 317—146 |

LEE. T. HIX, Primary Examiner

W. M. SHOOP, Jr., Assistant Examiner

U.S. Cl. X.R.

307—125; 317—148.5; 328—5; 340—258